Patented Jan. 31, 1933

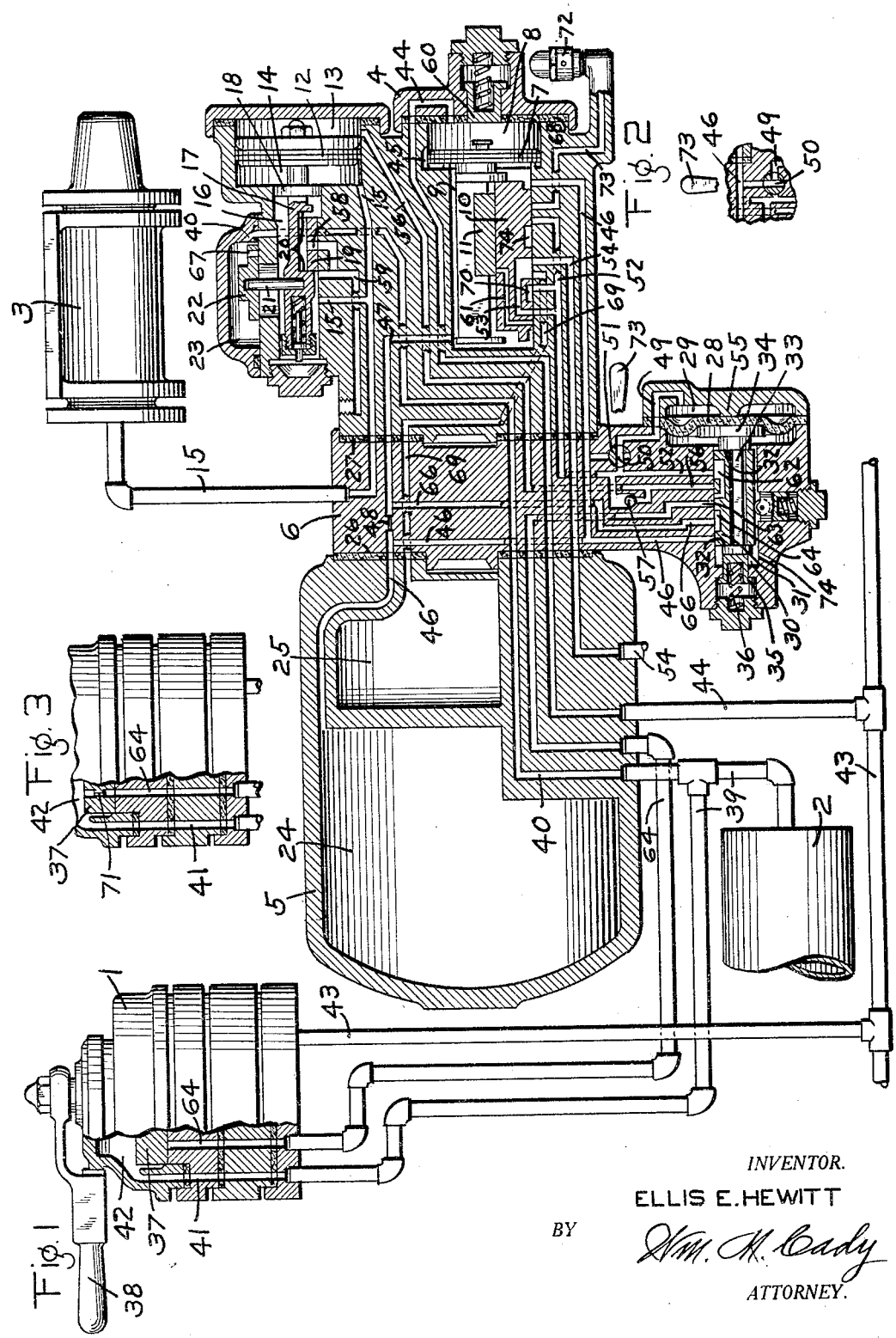

1,895,465

UNITED STATES PATENT OFFICE

ELLIS E. HEWITT, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed March 28, 1931. Serial No. 525,942.

This invention relates to fluid pressure brakes and more particularly to the type in which the brakes are applied by effecting a reduction in pressure in the brake pipe.

In effecting an application of the brakes on a train, the usual brake valve device on the locomotive is turned to a brake applying position to cause a reduction in brake pipe pressure which is first effective at the head end of a train. As a result, the brakes on the train apply serially from the front toward the rear and set up a retardation of the cars at the head end, which causes the slack in the train to run in and often cause excessive shocks.

One object of my invention is to provide improved means for delaying or holding back the application of brakes on the locomotive, so that the inertia of the locomotive will tend to keep the slack in the train pulled out and thus avoid excessive shocks.

Other objects and advantages will appear in the following more detailed description of my invention.

In the accompanying drawing: Fig. 1 is a diagrammatic view, mainly in section, of a portion of a locomotive brake equipment embodying my invention; Fig. 2 is a fragmentary view of a portion of the distributing valve device shown in Fig. 1 showing the hold back cut out valve in the cut out position; and Fig. 3 is a view of the brake valve device of Fig. 1, partly in section to show a fluid pressure connection which is established in emergency position of the brake valve.

As shown in the drawing, the locomotive brake equipment comprises a brake controlling valve device such as a distributing valve device, an automatic brake valve device 1, a main reservoir 2 and a brake cylinder 3.

The distributing valve device is of the usual well known construction comprising a valve portion 4 and a reservoir or chamber portion 5, and interposed between said portions is a filler portion 6 containing the hold back mechanism which will hereinafter be described.

The valve portion 4 of the distributing valve device comprises the usual equalizing portion and application portion. The equalizing portion comprises a piston 7 having at one side a chamber 8 and at the other side a valve chamber 9 containing a main slide valve 10 and an auxiliary slide valve 11 adapted to be operated by said piston. The application portion of the distributing valve device comprises a piston 12 having at one side a chamber 13 and at the other side a chamber 14 open to the brake cylinder 3 through a passage and pipe 15. Extending to the left from piston 12 and through a valve chamber 16 is a piston stem 17 having mounted thereon a baffle piston 18 separating chambers 14 and 16. An exhaust slide valve 19 is disposed in chamber 16 between spaced shoulders 20 on the stem 17 and is adapted to be operated thereby. Projecting upwardly from the stem 17 is a driving pin 21 operatively engaging an application slide valve 22 contained in a chamber 23.

The chamber portion 5 of the distributing valve device comprises a casing containing the pressure chamber or reservoir 24 and application chamber or reservoir 25, the application chamber 25 being adapted to perform a dual function according to my invention, one function being to increase the volume of the application piston chamber 13 in the usual manner, and the other function being that of a timing volume or reservoir, as will be hereinafter fully described.

The filler portion 6 of the distributing valve device comprises a casing which is provided with gasket faces 26 and 27 adapted to cooperate with corresponding faces on the valve portion 4 and chamber portion 5. Disposed in said casing is a flexible diaphragm 28 having at one side a chamber 29 and at the other side a chamber 30 open to the atmosphere through a passage 74 and containing a slide valve 31 adapted to be operated by deflection of said diaphragm. The slide valve 31 is disposed between two shoulders 32 on an operating stem 33 having at one end an enlarged follower-like head portion 34 engaging the diaphragm 28. The other end of stem 33 is engaged by a member 35 slidably mounted in the casing and subject to the pressure of a spring 36.

The automatic brake valve device 1 is of the usual construction, comprising a casing containing a rotary valve 37 adapted to be operated by a handle 38.

In operation, the main reservoir 2 is charged with fluid under pressure in the usual manner and fluid under pressure flows therefrom through pipe 39 and passage 40 to the application valve chamber 23 in the distributing valve device and also from pipe 39 through passage 41 in the brake valve device 1 to chamber 42 containing the rotary valve 37.

The brake valve device is operated in the usual manner to supply fluid under pressure to the brake pipe 43 from which fluid under pressure flows through pipe and passage 44 to the equalizing piston chamber 8 of the distributing valve device. With the equalizing piston 7 in release position, as shown in the drawing, fluid under pressure flows from chamber 8 through a feed groove 45 to valve chamber 9 and from thence through passage 46, which is uncovered in release position of the main slide valve 10, to the pressure chamber 24. Fluid under pressure also flows from the equalizing valve chamber 9 to the pressure chamber 24 through passage 47, choke 48 and passage 46.

In release position of the equalizing slide valve 10, diaphragm chamber 29 of the hold back valve device is open to the atmosphere through passage 49, port 50 in a plug valve 51, which is shown in Fig. 1 in its normal, cut-in position, passage 52, cavity 53 in the slide valve 10 and an atmospheric passage and pipe 54. With the diaphragm chamber 29 thus at atmospheric pressure, the pressure of spring 36 maintains the slide valve 31 and diaphragm 28 in the position shown in the drawing, in which position said diaphragm engages a stop lug 55 in the casing.

The application piston chamber 13 is open to the atmosphere in release position of the equalizing slide valve 10 by way of passage 56, past the ball check valve 57, through passage 52, cavity 53 in said equalizing slide valve and passage and pipe 54. This permits the application portion of the distributing valve device to remain in the release position shown in the drawing for reasons which will be hereinafter described. In the release position of the application portion, the brake cylinder 3 is open to the atmosphere through pipe and passage 15, exhaust valve chamber 16, port 58 in the exhaust slide valve 19 and the atmospheric passage 59.

Upon a gradual reduction in pressure in the brake pipe 43 and the connected equalizing piston chamber 8 of the distributing valve device, the equalizing piston 7 is moved toward the right hand and into engagement with the spring-pressed stop 60 by the pressure of fluid in valve chamber 9. This movement of piston 7 initially shifts the slide valve 11 relative to slide valve 10 so as to uncover the service port 61, after which further movement of said piston moves both of said slide valves to service position. The unrestricted communication through passage 46 from the pressure chamber 24 to the equalizing valve chamber 9 is maintained open until the main slide valve 10 is moved, so that the displacement of piston 7 in moving the slide valve 11 relative to slide valve 10 does not cause any appreciable reduction in pressure in the valve chamber 9. As a result, sufficient pressure is maintained in valve chamber 9 to shift the piston 7 and slide valves 10 and 11 to service position, in which passage 46 is lapped by the slide valve 10, but restricted communication is at all times maintained between the pressure chamber 24 and the equalizing valve chamber 9 through passage 47 and choke 48, which choke has insufficient capacity to offset the above mentioned displacement of piston 7.

In service position of the equalizing slide valves 10 and 11, the service port 61 in the slide valve 10 registers with passage 52 in the slide valve seat and is uncovered by the graduating valve 11. This permits fluid under pressure to flow from the equalizing valve chamber 9 through passage 52 to cavity 62 in the hold back slide valve 31 and also from passage 52 through port 50 in the plug valve 51 and passage 49 to the diaphragm chamber 29. A cavity 70 in the equalizing slide valve 10 connects passage 52 to a passage 69 leading to the application chamber or timing reservoir 25, so that at the same time as fluid under pressure flows to diaphragm chamber 29, it also flows to chamber 25. Since the equalizing valve chamber 9 communicates with pressure chamber 24 through passage 47, choke 48 and passage 46, fluid under pressure flows to said equalizing valve chamber as the pressure in said chamber is reduced by flow to diaphragm chamber 29 and reservoir 25, the rate of such flow being governed by the flow area of choke 48 which consequently governs the rate at which pressure builds up in the diaphragm chamber 29 and reservoir 25.

When a predetermined pressure is thus built up in the diaphragm chamber 29 and the reservoir 25, this pressure acting on diaphragm 28 overcomes the resisting force of spring 36 and moves the diaphragm 28 and slide valve 31 toward the left hand and until the follower head 34 engages the casing.

In the left hand position of the hold back slide valve 31, the cavity 62 connects passages 52, 56 and a passage 63. This permits fluid under pressure supplied to passage 52 to flow to passage 56 and from thence to the application piston chamber 13. Fluid under pressure supplied through cavity 62 to passage 63 flows therefrom through pipe and passage 64 to the seat of the rotary valve 37 in the automatic brake valve device, and said rotary valve is adapted to maintain said passage lapped at all times except when moved to emergency position, as will be hereinafter described in detail.

When the hold back valve is in its left hand position, a cavity 64 connects passage 46 from the pressure chamber 24 to a passage 66, thereby forming an unrestricted by-pass around the choke 48 so as to permit a rapid flow of fluid under pressure to the equalizing valve chamber 9. From the equalizing valve chamber 9 the rate of flow to the application piston chamber 13, the application chamber 25 and diaphragm chamber 29 through the service port 61 and passage 52 is controlled by the flow area of said service port 61 in the equalizing slide valve 10, which flow area is greater than that of the choke 48.

The pressure of fluid thus supplied to the application piston chamber 13 moves the application piston 12, the exhaust slide valve 19 and the application slide valve 22 toward the left to application position. In application position, the exhaust slide valve 19 laps the atmospheric passage 59 and the application slide valve 22 is moved so as to permit fluid under pressure from the main reservoir 2 to flow from chamber 23 through port 67 in said slide valve to valve chamber 16 and from thence through passage and pipe 15 to the brake cylinder 3 and apply the brakes.

When the pressure of fluid in the equalizing valve chamber 9 is reduced to a degree substantially equal to or slightly less than the reduced brake pipe pressure in the piston chamber 8, the pressure in chamber 8 moves the piston 7 and graduating valve 11 toward the left hand to lap position in which the movement of the piston 7 is stopped by engagement with the main slide valve 10. In lap position, the service port 61 is lapped by the auxiliary slide valve 11 so as to prevent further flow of fluid under pressure to the application piston chamber 13.

When the pressure of fluid supplied to the brake cylinder, and acting in valve chamber 16 and through the brake cylinder passage 15 in chamber 14, is built up to a degree substantially equal to or slightly greater than the pressure in chamber 13, the piston 12 is shifted to lap position. This movement of piston 12 is only sufficient to disconnect port 67 in the application slide valve 22 from chamber 16 and does not move the exhaust slide valve 19, due to the lost motion between the ends of said slide valve and the operating shoulders 20 on the stem 17. The supply of fluid under pressure to valve chamber 16 and brake cylinder 3 is thus cut off and said chamber and cylinder are bottled up.

From the above description of effecting a service application of the brakes, it will be noted that although the equalizing valve portion moves to service position in the usual manner upon a service reduction in brake pipe pressure, fluid under pressure is not directly supplied to the application cylinder 13, but instead is supplied to the diaphragm chamber 29 and timing reservoir or chamber 25 and the rate of pressure built up in said chamber and reservoir is restricted by the choke 48. The hold back valve device then operates only after a predetermined time as governed by the size of choke 48 and the combined volumes of diaphragm chamber 29 and reservoir 25 to supply fluid under pressure to the application piston chamber 13 to apply the brakes, the rate of flow to said piston chamber being then governed by the flow rate of the service port 61 in the slide valve 10 on account of the opening of the unrestricted by-pass around choke 48 through passages 46 and 66. Thus, the locomotive brakes are not applied upon the initiation of the brake pipe reduction but are held back for a predetermined time during which brake pipe pressure continues to reduce, but after such a delay, the locomotive brakes are applied in the usual manner and at the usual rate. It will further be noted that the volume 25 initially acts as a timing reservoir in conjunction with the choke 48, but after movement of the hold back valve device to its left hand position, said volume serves merely to increase the volume of the application piston chamber 13.

When a sudden emergency reduction in brake pipe pressure is effected, the equalizing piston 7 and slide valves 10 and 11 at first move only to service position, in which said piston engages the spring-pressed stop 60. This is due to the fact that the rate at which fluid under pressure is supplied from the valve chamber 9 through the service port 61 and passage 52 to the diaphragm chamber 29 and application chamber 25 exceeds the rate of supply of fluid to said valve chamber through the choke 48 to such an extent that the pressure in said valve chamber 9 becomes so reduced that there is not a sufficient pressure in valve chamber 9 acting on the piston 7 to move said piston to emergency position into engagement with gasket 68 against the reduced fluid pressure in chamber 8 and the resistance of the spring-pressed stop 60. After a predetermined delay period as in effecting a service application of the brakes, the hold back diaphragm 28 shifts the slide valve 31 to its left hand position, in which communication is established through passage 46, cavity 64 in said slide valve and passage 66, so as to render choke 48 ineffective, and also communication is established from passage 52 through cavity 62 in said slide valve to passage 56 leading to the application piston chamber 13 and to passage 63 leading to pipe 64 from the brake valve device.

When choke 48 is by-passed as just described, the rate at which fluid under pressure is supplied from the pressure chamber 24 to the equalizing valve chamber 9 exceeds the venting rate of the service port 61 to such an extent as to build up sufficient pressure differential in valve chamber 9 on piston 7 to move it to emergency position into engagement with gasket 68. In emergency position of the equalizing slide valve, passages 52 and 69 are not connected as in service position, and the left hand end of said slide valve uncovers the passage 52 which permits fluid under pressure to flow from valve chamber 9 and consequently the pressure chamber 24 to passage 52 and from thence to the application piston chamber 13, so as to thus effect an application of the brakes at an emergency rate. Since passage 69 from the application chamber 25 is lapped in emergency position of the slide valve 10, fluid under pressure equalizes from the pressure chamber 24 only into the application piston chamber 14 and produces a higher pressure than is obtained in effecting a service application of the brakes.

To effect an emergency reduction in brake pipe pressure, the automatic brake valve device 1 is turned to emergency position, shown in Fig. 3, in which a restricted port 71 in the rotary valve 37 registers with passage 64 which is connected through pipe 64 and passage 63 to the seat of the hold back slide valve 31. In the left hand position of the slide valve 31, passage 63 is connected through cavity 62 to passage 52 and passage 56, so that fluid under pressure is permitted to flow from rotary valve chamber 42, which is supplied with fluid under pressure from the main reservoir 2, to the application piston chamber 13. This flow to chamber 13 is continuous so long as the brake valve device is in emergency position and is adapted to maintain the pressure in said chamber, against any possible leakage therefrom, at the adjustment of a safety valve device 72, which is of any suitable construction and is connected to said chamber through passage 73, a cavity 74 in the equalizing slide valve 10 and passage 52.

It will be noted that when an emergency reduction in brake pipe pressure is effected, the equalizing piston 7 and slide valves 10 and 11 initially move only to service position, in which the application of brakes is delayed in the same manner as when a service application of the brakes is effected. However, after the hold back valve device is shifted to its left hand position, the equalizing piston 7 and slide valves 10 and 11 move to emergency position, in which the pressure chamber is isolated and fluid under pressure is supplied to the application piston chamber 13 at an emergency rate and a higher pressure is obtained in said cylinder than is obtained when a service application of the brakes is effected. Furthermore, the hold back slide valve 31 establishes communication through which fluid under pressure is supplied for maintaining the pressure in the application piston chamber 13 at the adjustment of the usual safety valve device 72.

To effect a release of the brakes after an application, the brake pipe 43 is charged with fluid under pressure supplied through the automatic brake valve device 1 in the usual manner. The consequent increase in brake pipe pressure shifts the equalizing piston 7 and slide valves 10 and 11 to release position in which the feed groove 45 is uncovered by said piston and permits fluid under pressure to flow from the piston chamber 8 to the valve chamber 9 and from thence through passage 46 to the pressure chamber 24. Fluid under pressure also flows from the equalizing valve chamber 9 to the pressure chamber 24 through passage 47, choke 48 and passage 46.

In release position of the equalizing slide valve 10, fluid under pressure is vented from the application piston chamber 13 to the atmosphere through passage 56, past the ball check valve 57, through passage 52, cavity 53 in said slide valve and the atmospheric passage and pipe 54. Upon venting fluid under pressure from the application piston chamber 13, brake cylinder pressure in chamber 14 shifts the piston 12 and slide valves 19 and 22 to the release position shown in the drawing, in which position fluid under pressure is vented from the brake cylinder 3 through pipe and passage 15, exhaust valve chamber 16, port 58 in the exhaust slide valve 19 and through the atmospheric passage 59, thereby effecting a release of the brakes.

At the same time as fluid under pressure is vented from the application piston chamber 13 by way of the ball check valve 57, and consequently independently of the hold back slide valve 31, fluid under pressure is also vented from the diaphragm chamber 29 through passage 49, port 50 in the cut out valve 51 and through the vented passage 52, and the chamber 25 is opened to the atmosphere through passage 69, cavity 53 in the slide valve 10 and passage 54.

When the pressure of fluid in diaphragm chamber 29 is thus reduced to a predetermined degree, spring 36 returns the slide valve 31 and diaphragm 28 to their normal or release position, in which said diaphragm engages the stop 55.

If for any reason it is desired to render the hold back diaphragm 28 and slide valve 31 inoperative to hold back the application of locomotive brakes, the cut out valve 51 is turned from the cut in position shown in Fig. 1, to the cut out position shown in Fig. 2, by the handle 73. In the cut out position of the plug valve 51, the registration of the three way port 50 is changed and connects passage 46 to passage 49 leading to the diaphragm chamber 29. As a result, fluid under pressure from the pressure chamber 24 is supplied through passage 46 to diaphragm chamber 29 and holds the hold back diaphragm 28 and slide valve 31 in the left hand position, in which a direct connection is maintained from the seat of the equalizing slide valve 10 to the application piston chamber 13 through passage 52, cavity 62 in the hold back slide valve 31 and passage 56, and the choke 48 is thus rendered ineffective due to the by-pass around said choke being maintained open through passage 46, cavity 64 in the hold back slide valve 31 and passage 66. Furthermore, the connection between passage 63 from the automatic brake valve device 1 and passage 56 from the application piston chamber 13 is maintained open through cavity 62 in the hold back slide valve 31. With the hold back slide valve 31 thus maintained in its left hand position, the distributing valve device and brake valve device will operate to control the brakes on the locomotive in the usual well known manner.

It will be evident that the equalizing portion of the distributing valve device may be arranged to supply fluid under pressure directly to the brake cylinder 3 instead of to the application piston chamber 13, by merely connecting the passage 56 to the brake cylinder pipe 15 and the claims are intended to include both the direct and indirect supply of fluid to the brake cylinder.

While one illustrative embodiment of the invention has been described in detail, it is not my invention to limit its scope to that embodiment or otherwise than by the terms of the appended claims.

Having now described my invention, what I claim as new and desire to secure by Letters Patent, is:

1. In a fluid pressure brake, the combination with a brake pipe, of an equalizing valve device operative upon a reduction in brake pipe pressure to supply fluid under pressure to a chamber, an increase in pressure in which effects an application of the brakes, and valve means for controlling communication through which said valve device supplies fluid to said chamber and operative by the pressure of fluid supplied by said equalizing valve device to open said communication.

2. In a fluid pressure brake, the combination with a brake pipe, of an equalizing valve device operative upon a reduction in brake pipe pressure to supply fluid under pressure to a chamber, an increase in pressure in which causes an application of the brakes, and valve means for controlling communication through which said valve device supplies fluid to said chamber and operative by a predetermined build up of pressure supplied by said equalizing valve device for opening said communication.

3. In a fluid pressure brake, the combination with a brake pipe, of a valve device for controlling communication through which fluid under pressure is supplied for effecting an application of the brakes, a reservoir normally charged with fluid under pressure, an equalizing valve device operative upon a reduction in brake pipe pressure to supply fluid under pressure from said reservoir to said valve device for moving said valve device to open said communication, and means for timing the movement of said valve device so that said valve device opens said communication a predetermined time after the start of the reduction in brake pipe pressure.

4. In a fluid pressure brake, the combination with a brake pipe, of a valve device for controlling communication through which fluid under pressure is supplied for effecting an application of the brakes, a reservoir normally charged with fluid under pressure, an equalizing valve device operative upon a reduction in brake pipe pressure to supply fluid under pressure from said reservoir to said valve device for moving said valve device to open said communication, and means for restricting the flow of fluid under pressure from said reservoir to said valve device, said valve device being operative upon opening said communication to render said means ineffective.

5. In a fluid pressure brake, the combination with a brake pipe, of a valve device for controlling communication through which fluid under pressure is supplied for effecting an application of the brakes, a reservoir normally charged with fluid under pressure, an equalizing valve device operative upon a reduction in brake pipe pressure to supply fluid under pressure from said reservoir to said valve device for moving said valve device to open said communication, a choke for controlling the flow of fluid under pressure from said reservoir to said valve device, said valve device being operative to establish an unrestricted communication around said choke upon opening the first mentioned communication.

6. In a fluid pressure brake, the combination with a brake pipe, a reservoir, and valve means operative by fluid under pressure for controlling the supply of fluid under pressure from said reservoir for effecting an application of the brakes, of an equalizing valve device operative upon an increase in brake pipe pressure to supply fluid under pressure from said brake pipe to said reservoir through two passages and operative upon a reduction in brake pipe pressure to close communication through one of said passages and to supply fluid under pressure from said reservoir to said valve means through the other of said passages.

7. In a fluid pressure brake, the combination with a brake pipe, a reservoir, and valve means movable by fluid under pressure to a brake application position for supplying fluid under pressure from said reservoir for effecting an application of the brakes, a valve device operative upon an increase in brake pipe pressure to supply fluid under pressure from said brake pipe to said reservoir through a restricted passage and at the same time through an unrestricted passage and operative upon a reduction in brake pipe pressure to close said unrestricted passage and to supply fluid under pressure from said reservoir through said restricted passage to said valve means, said valve means being operative in brake application position to establish another communication by-passing said restricted passage.

8. In a fluid pressure brake, the combination with a brake pipe, and a reservoir, of an equalizing valve device operative upon an increase in brake pipe pressure to supply fluid under pressure from said brake pipe to said reservoir through an unrestricted passage and through a passage containing a choke, and operative upon a reduction in brake pipe pressure to close said unrestricted pasage and to supply fluid under pressure from said other passage to a communication through which fluid under pressure is supplied from said reservoir to effect an application of the brakes, and a valve device for controlling said communication and comprising a valve for opening said communication and for at the same time establishing another communication around said choke, a spring, and an abutment for operating said valve, said abutment being subject on one side to the pressure of said spring and on the opposite side to the pressure of fluid in the first mentioned communication.

9. In a fluid pressure brake, the combination with a brake pipe, a reservoir, and an equalizing valve device operative upon a reduction in brake pipe pressure to supply fluid under pressure from said reservoir for effecting an application of the brakes, of a hold back valve device controlled by fluid under pressure supplied from said reservoir through said equalizing valve device for temporarily delaying the flow of fluid from said equalizing valve device for effecting an application of the brakes, said hold back valve device comprising a valve for opening communication through which fluid under pressure flows from said equalizing valve device to effect an application of the brakes, a spring, and an abutment for moving said valve, said abutment being subject on one side to the pressure of said spring and on the opposite side to the pressure of fluid supplied through said equalizing valve device.

10. In a fluid pressure brake, the combination with a brake pipe, a reservoir, and an equalizing valve device operative upon a reduction in brake pipe pressure to supply fluid under pressure from said reservoir for effecting an application of the brakes, of a hold back valve device controlled by fluid under pressure supplied from said reservoir through said equalizing valve device for temporarily relaying the flow of fluid from said equalizing valve device for effecting an application of the brakes, said hold back valve device comprising a valve for opening communication through which fluid under pressure flows from said equalizing valve device to effect an application of the brakes, a spring, and an abutment for moving said valve, said abutment being subject on one side to the pressure of said spring and on the opposite side to the pressure of fluid supplied through said equalizing valve device, and means for connecting said opposite side of said abutment to said reservoir for rendering said hold back valve device inoperative.

11. In a fluid pressure brake, the combination with a brake pipe, a reservoir, and a valve device operative by fluid under pressure for controlling the supply of fluid under pressure from said reservoir to effect an application of the brakes, of an equalizing valve device operative upon a reduction in brake pipe pressure to supply fluid under pressure from said reservoir to said valve device, and valve means for controlling communication from said equalizing valve device to said valve device and having a cut out position for supplying fluid under pressure from said reservoir to said valve device independent of said equalizing valve device.

12. In a fluid pressure brake, the combination with a brake pipe, a reservoir, and a valve device operative by fluid under pressure for controlling the supply of fluid under pressure from said reservoir to effect an application of the brakes, of an equalizing valve device operative upon a reduction in brake pipe pressure to supply fluid under pressure from said reservoir for operating said valve device and operative upon an increase in brake pipe pressure to supply fluid under pressure from said brake pipe to said reservoir and to vent fluid under pressure for effecting a release of the brakes independent of said valve device.

13. In a fluid pressure brake, the combination with a brake pipe, a reservoir, a valve device operative by fluid under pressure for controlling the supply of fluid under pressure from said reservoir for effecting an application of the brakes, an equalizing valve device operative upon a reduction in brake pipe pressure to control the supply of fluid under pressure to said valve device for operating said valve device and for effecting an application of the brakes, a brake valve device having an application position for reducing the brake pipe pressure, and operative in said position to supply fluid under pressure to said valve device, said valve device being also operative by fluid under pressure to connect the supply of fluid under pressure from said brake valve device to the supply from said reservoir, and valve means for limiting the pressure of fluid supplied through said valve device to effect an application of the brakes.

14. In a fluid pressure brake, the combination with a brake pipe, a reservoir, and means operated by fluid under pressure for effecting an application of the brakes, a brake valve device for effecting a reduction in brake pipe pressure and having an emergency position for supplying fluid under pressure to said means, an equalizing valve device operative upon a reduction in brake pipe pressure to supply fluid under pressure from said reservoir to said means, valve means for holding back the supply of fluid under pressure from said brake valve device and from said equalizing valve device to said means and operative by fluid under pressure supplied through said equalizing valve device for opening communication through which fluid under pressure is supplied to said means, and timing means for controlling the operation of said valve means in accordance with the initiation of the brake pipe reduction.

15. In a fluid pressure brake, the combination with a brake pipe, a reservoir, and means operated by fluid under pressure for effecting an application of the brakes, a brake valve device for effecting a reduction in brake pipe pressure and having an emergency position for supplying fluid under pressure to said means, an equalizing valve device operative upon a reduction in brake pipe pressure to supply fluid under pressure from said reservoir to said means, valve means for holding back the supply of fluid under pressure from said brake valve device and from said equalizing valve device to said means and operative by fluid under pressure supplied through said equalizing valve device for opening communication through which fluid under pressure is supplied to said means, timing means for delaying the operation of said valve means to open said communication, and a valve device for supplying fluid under pressure from said reservoir to said valve means for maintaining said valve means in the position for opening said communication.

16. In a fluid pressure brake, the combination with a brake pipe, and a reservoir normally charged with fluid under pressure, of an equalizing valve device movable to service position or through service position to emergency position in accordance with the rate of reduction in brake pipe pressure for supplying fluid under pressure from said reservoir to effect an application of the brakes, and timing means operative by fluid under pressure supplied through said equalizing valve device for controlling the supply of fluid under pressure from said equalizing valve device for effecting an application of the brakes, said timing means being also operative to stop the movement of said equalizing valve device in service position in its movement to emergency position until after the operation of said timing means.

17. In a locomotive fluid pressure brake equipment, the combination with a brake pipe and a valve device operated upon a reduction in brake pipe pressure for supplying fluid under pressure to a chamber, an increase in pressure in which effects an application of the brakes, of valve mechanism operated by a variation in fluid pressure for establishing communication through which said valve device supplies fluid to said chamber, said valve mechanism being operated by fluid supplied by said valve device.

18. In a locomotive fluid pressure brake equipment, the combination with a brake pipe and a valve device operated upon a reduction in brake pipe pressure for supplying fluid under pressure to a chamber, an increase in pressure in which operates to effect an application of the brakes, of a valve mechanism operated upon a predetermined increase in the pressure of fluid supplied by said valve device for opening communication through which said valve device supplies fluid to said chamber.

19. In a locomotive fluid pressure brake equipment, the combination with a brake pipe and a valve device operated upon a reduction in brake pipe pressure for supplying fluid under pressure to a chamber, an increase in pressure in which operates to effect an application of the brakes, of a valve mechanism operated upon a predetermined increase in the pressure of fluid supplied by said valve device for opening communication through which said valve device supplies fluid to said chamber, said valve device operating upon a reduction in brake pipe pressure to supply fluid under pressure at a restricted rate to said valve mechanism.

In testimony whereof I have hereunto set my hand, this 25th day of March, 1931.

ELLIS E. HEWITT.